United States Patent [19]

Furtek

[11] Patent Number: 4,769,429
[45] Date of Patent: Sep. 6, 1988

[54] PROCESS FOR POLYMERIZING ALPHA-OLEFINS

[75] Inventor: Allan B. Furtek, Warren, N.J.

[73] Assignee: Mobil Oil Corporation, New York, N.Y.

[21] Appl. No.: 925,009

[22] Filed: Oct. 30, 1986

Related U.S. Application Data

[62] Division of Ser. No. 805,634, Dec. 6, 1985, Pat. No. 4,670,413.

[51] Int. Cl.$^4$ ............................ C08F 4/62; C08F 4/64; C08F 4/68
[52] U.S. Cl. ................................. 526/129; 526/90; 526/125; 526/142; 526/151; 526/156; 526/159; 526/348.2; 526/348.6; 526/352
[58] Field of Search ................. 526/90, 125, 129, 142, 526/151, 156, 159

[56] References Cited

U.S. PATENT DOCUMENTS 4,481,301 11/1984 Nowlin et al. ................. 526/129 X

FOREIGN PATENT DOCUMENTS 0120503 10/1984 European Pat. Off. .

OTHER PUBLICATIONS

Shida et al., *Polymer Preprints* (ACS Div. Poly. Chem.), 24(1), pp. 110–111, Mar. 1983.
McDaniel, *Journal of Polymer Science: Polymer Chemistry Edition*, vol. 19, 1967–1976 (1981).
Hogan et al., Journal of Applied Polymer Science: Applied Polymer Symposium, 36, 49–60 (1981).

*Primary Examiner*—Patrick P. Garvin
*Attorney, Agent, or Firm*—Alexander J. McKillop; Michael G. Gilman; Stanislaus Aksman

[57] ABSTRACT

A supported solid catalyst composition for polymerizing alpha-olefins is prepared by treating a carrier with a transition metal compound. The carrier utilized in the synthesis must have such an average pore diameter that the resulting catalyst composition has an average pore diameter of at least about 170 Angstroms. The catalyst composition has higher productivity than similar catalyst compositions of lower average pore diameter, and it produces polymers of lower density and higher melt and high load melt indexes than such similar catalyst compositions of lower average pore diameter. Also disclosed is a process for polymerizing alpha-olefins in the presence of the catalyst of the invention.

22 Claims, 6 Drawing Sheets

PROCESS FOR POLYMERIZING ALPHA-OLEFINS

CROSS-REFERENCE TO RELATED APPLICATIONS

This application is a divisional of copending application Ser. No. 805,634, filed on Dec. 6, 1985, now U.S. Pat. No. 4,670,413.

BACKGROUND OF THE INVENTION

1. Field of the Invention

The present invention relates to a method for polymerizing alpha-olefins, a catalyst for such a polymerization method and a method for producing such a catalyst. A particular aspect of the present invention relates to a method for preparing a high activity catalyst composition which produces linear low density polyethylene (LLDPE) and to the polymerization process utilizing such a catalyst composition.

2. Description of the Prior Art

Linear low density polyethylene polymers possess properties which distinguish them from other polyethylene polymers, such as ethylene homopolymers. Certain of these properties are described by Anderson et al, U.S. Pat. No. 4,076,698.

Karol et al, U.S. Pat. No. 4,302,566, describe a process for producing certain linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al, U.S. Pat. No. 4,481,301, the entire contents of which are incorporated herein by reference, disclose a supported alpha-olephin polymerization catalyst composition prepared by reacting a support containing OH groups with a stoichiometric excess of an organomagnesium composition, with respect to the OH groups content, and then reacting the product with a tetravalent titanium compound.

It is a primary object of the present invention to prepare a high activity catalyst for the polymerization of alpha-olefins which yields polymerization products having a relatively low density.

Additional objects of the present invention will become apparent to those skilled in the art from the following description.

SUMMARY OF THE INVENTION

A supported, alpha-olefin polymerization catalyst composition is synthesized by contacting a solid, porous carrier with a transition metal compound.

In a preferred embodiment, the solid, porous carrier is first contacted with a magnesium compound, and then the resulting intermediate is contacted with the transition metal compound.

In the most preferred embodiment, the catalyst composition is synthesized in a multi-step process substantially similar to that of Nowlin et al, U.S. Pat. No. 4,481,301. In the first step, a solid, porous carrier having reactive OH groups is reacted with a liquid containing at least one organomagnesium composition having the empirical formula:

$$R_nMgR'_{(2-n)}$$

wherein R and R' are the same or different and they are $C_1$-$C_{12}$ hydrocarbyl groups, provided that R' may also be a halogen, and n is 0, 1 or 2. The number of moles of the organomagnesium composition is in excess of the number of moles of the OH groups on the carrier.

In the second step, the liquid is carefully removed, e.g., evaporated to produce a supported magnesium composition in the form of a dry, free-flowing powder.

In the third step, the powder is reacted with at least one transition metal compound dissolved in a liquid medium. The number of moles of the transition metal compound in the liquid medium is greater than the number of the OH groups on the carrier before the carrier is reacted in the first step with the organomagnesium composition. As a result of this step, a reacted form of transition metal becomes supported on the carrier.

The improvement of the present invention comprises using a solid, porous carrier having a specific average pore diameter. The carrier has such an average pore diameter that the resulting supported catalyst composition has an average pore diameter of at least about 170 Angstroms (Å). The catalyst composition exhibits substantially higher activity, greater comonomer response (i.e., more efficient comonomer incorporation) and improved hydrogen response properties than similar catalyst compositions prepared with porous carrier materials having smaller pore diameters.

The invention is also directed to an alpha-olefin polymerization process conducted in the presence of the catalyst composition of this invention and to the polymers produced thereby.

DETAILED DESCRIPTION OF THE INVENTION

We found that the use of the carrier having such an average pore diameer that the resulting catalyst composition has an average pore diameter of at least about 170 Å produces improved catalyst compositions having substantially improved catalyst productivity, as compared to similar catalyst compositions synthesized with the carrier materials having smaller average pore diameter. The novel catalyst composition, when used in alpha-olefin polymerization reactions, produces linear low density polyethylene polymer resins (LLDPE) having substantially lower density and substantially higher values of melt and high load melt indexes (MI, expressed as $I_2$, and HLMI, expressed as $I_{21}$, respectively) than similar resins produced with similar catalyst compositions synthesized with carrier materials having smaller average pore diameter.

It was found that, to obtain the catalyst composition of this invention, having improved properties identified above, the average pore diameter of the carrier and the corresponding average pore diameter of the catalyst composition must be as follows:

| | Average Pore Diameter (Angstroms) | | |
|---|---|---|---|
| | General | Preferred | Most Preferred |
| Carrier | at least about 230 | about 230–about 350 | about 240–about 310 |
| Catalyst Composition | at least about 170 | about 170–about 220 | about 175–about 215 |

The use of carriers having smaller average pore diameter (e.g., see Nowlin et al., U.S. Pat. No. 4,481,301) produces similar catalyst compositions having correspondingly smaller average pore diameter. Such catalyst compositions have substantially lower productivity and produce LLDPE resins of higher density and lower values of MI and HLMI than the catalyst compositions of this invention. The improvement of the present invention is unexpected, especially since other workers in this field have not observed any significant change in the polymer melt indexes with increasing average pore diameter of similar magnesium and/or magnesium/-titanium supported catalysts, nor the correlation between the average pore diameter of the catalyst and the density of polymer resins prepared with the resulting catalyst compositions, e.g., see Shida et al., *Polym. Prep. (ACS, Division of Polymer Science)*, 24 (1), 1983, pages 110-111.

The average pore diameter, in Angstroms, of the carrier can be determined in any conventional manner, known to those skilled in the art. For example, it can be calculated from the following equation:

$$\text{diameter} = \frac{4 \times PV}{SA}$$

where
PV is sample pore volume (cc/gram)
SA is sample surface area (m²/gram)

Surface area is measured using nitrogen adsorption at liquid nitrogen temperatures, for example, by the BET method, described by S. Brunauer, P. Emmett, and E. Teller in the *Journal of the American Chemical Society*, Vol. 60, page 309, 1938, the entire contents of which are incorporated herein by reference. Pore volume can also be measured using nitrogen adsorption or water titration in the manner known to those skilled in the art.

The polymers prepared in the presence of the catalyst of this invention are homopolymers of ethylene or copolymers of ethylene and higher alpha-olefins. They exhibit relatively high values of melt index ($I_2$) and of high load melt index ($I_{21}$), but comparable values of melt flow ratio (MFR), defined as the ratio $I_{21}/I_2$, as similar polymers prepared in the presence of similar, previously-known catalyst compositions, e.g., those disclosed by Nowlin et al, U.S. Pat. No. 4,481,301. Thus, the polymers prepared with catalysts of this invention are especially suitable for the production of injection molding products and thermoplastic films.

Catalysts produced according to the present invention are described below in terms of the manner in which they are made.

Carrier materials which may be used in the present invention are solid, porous materials, such as silica, alumina, silica-alumina, and combinations thereof, so long as the average pore diameter thereof is of the size specified above. The carriers usually have the form of particles having a particle size of about 1 to about 150 microns, preferably about 10 to about 80 microns. Preferably, the carrier is in the form of spherical particles, e.g., spray-dried silica. The internal porosity of the carriers is about 80%. The surface area of the carriers is about 250 to about 350 m²/gm, preferably about 280 to about 330²/gm.

Physically-bound water is removed from the carrier prior to the contact thereof with the organomagnesium composition. The water is removed, for example, by heating the carrier at ambient pressure in an atmosphere of dry air or inert gas, such as nitrogen for 1 to about 24 hours, at a temperature of about 100° C. to the upper temperature limit represented by the temperature at which change of state or sintering occurs. Suitable heating temperature is about 100° C. to about 850° C., preferably about 150° C. to about 800° C. and most preferably about 600° C. to about 800° C.

Specific examples of suitable carriers are silica materials available from the PQ Corporation, Valley Forge, Pennsylvania, under the tradenames of CS 2133 and CS 3131.

Suitable transition metal compounds used herein are compounds of a transition metal of Groups IVA, VA, VIA, VII A or VIII of the Periodic Chart of the Elements, as published by the Fisher Scientific Company, Catalog No. 5-702-10, 1978. Such compounds are any transition metal compounds used heretofore in Ziegler-Natta catalyst compositions. Non-limiting examples of such transition metal compounds are compounds of titanium, vanadium, molybdenum, zirconium or chromium, e.g., TiCl$_4$, TiCl$_3$, VCl$_4$, VCl$_3$, VOCl$_3$, dialkoxyvanadium dichlorides, MoCl$_5$, ZrCl$_4$ and chromiumacetylacetonate. Of these compounds, the compounds of titanium and vanadium are preferred, and the compounds of titanium are most preferred.

Suitable magnesium compounds used in the preferred embodiment are also any magnesium compounds used heretofore in Ziegler and Ziegler-Natta catalyst compositions. Non-limiting examples of such compounds are magnesium halide or organomagnesium compositions, such as MgCl$_2$, MgI$_2$, Grignard reagents the empirical formula:

$$R_nMgR'_{(2-n)}$$

where R and R' are the same or different C$_1$-C$_{12}$ hydrocarbyl groups, provided that R' may also be a halogen, and n is 0, 1 or 2.

The carrier is contacted with the transition metal compound in any conventional manner used heretofore to contact the carrier with the transition metal compound in synthesizing Ziegler and Ziegler-Natta catalysts. Thus, the carrier is usually contacted with a solution of the transition metal in a suitable solvent in which the transition metal is at least partially soluble and which is liquid at reaction temperatures. Suitable solvents are those used heretofore in such synthesis, e.g., those disclosed by Stevens et al, U.S. Pat. No. 3,787,384; Ziegler, deceased et al, U.S. Pat. No. 4,063,009; Anderson et al, U.S. Pat. No. 4,076,698; Strobel et al, U.S. Pat. No. 4,148,754; Melquist, U.S. Pat. No. 4,154,701; Graff, U.S. Pat. No. 4,173,547; Shida et al, U.S. Pat. No. 4,263,171; and, Nowlin et al, U.S. Pat. No. 4,481,301, the entire contents of all of which are incorporated herein by reference. Suitable non-limiting examples of solvents are alkanes, such as hexane, n-heptane, octane, nonane and decane.

Similarly, in the preferred embodiment of the invention wherein a magnesium compound is first reacted with the carrier, prior to the reaction of the resulting product with the transition metal compound, the carrier is contacted with the magnesium compound in any conventional manner used heretofore to contact the carrier with the magnesium compound in synthesizing Ziegler and Ziegler-Natta catalysts. Thus, the carrier is usually contacted with a solution of the magnesium compound in suitable solvents. Such solvents are those used heretofore in the synthesis of Ziegler and Ziegler-Natta polymerization catalyst composition, as also disclosed in the aforementioned patents to Stevens et al, Ziegler, deceased et al, Anderson et al, Strobel et al, Melquist, Graff, Shida et al and Nowlin et al. Suitable non-limiting examples of solvents are ethers, such as aliphatic ethers, e.g., diethyl ether, diisopropyl ether, dibutyl ether, dipentyl ether, and cyclic ethers, such as tetrahydrofuran and dioxane.

The invention will now be described in conjunction with the most preferred embodiment thereof. However, it will be apparent to those skilled in the art that it is not limited to this embodiment and that all of the embodiments of the invention can be practiced in accordance with the descriptions thereof contained herein.

In the most preferred embodiment, suitable organomagnesium compositions and liquids used for dissolving such organomagnesium compositions, and the manner of using thereof in the first step of the catalyst synthesis process are those disclosed by Nowlin et al, U.S. Pat. No. 4,481,301. Accordingly, only the most important features of such materials and of the manner of conducting the catalyst synthesis steps will be discussed herein.

Chemically bound water and excess OH groups, e.g., as represented by the presence of the OH groups in the carrier, may be present when the carrier is contacted with water-reactive organomagnesium compositions or compounds in accordance with the present invention. Excess OH groups present in the carrier may be removed by heating the carrier, prior to the contacting step, for a sufficient time at a sufficient temperature to accomplish the desired degree of the OH groups removal. A relatively small number of OH groups is removed by sufficient heating at from about 150° C. to about 250° C., whereas a relatively large number of OH groups may be removed by sufficient heating at at least 500° or 600° C., preferably from about 750° C. to about 850° C. The heating is continued for about 4 to about 16 hours. The amount of the hydroxyl groups in silica may be determined according to the method disclosed by J. B. Peri and A. L. Hensley, Jr., in *J. Phys. Chem.*, 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

A dehydrated carrier material is treated with a solution of a solid organomagnesium composition in a liquid, the organomagnesium composition being capable of reacting with a tetravalent titanium compound. The organomagnesium composition has the empirical formula $R_nMgR'_{(2-n)}$, where R and R' are the same or different and they are C$_1$-C$_{12}$ hydrocarbyl groups, preferably C$_1$-C$_{12}$ alkyl groups, more preferably C$_1$-C$_{12}$ unsubstituted alkyl groups, yet more preferably C$_1$-C$_4$ alkane groups, and most preferably C$_2$-C$_4$ alkane groups provided that R' may be a halogen, and n is 0, 1 or 2. If R' is a haloglen, it is preferably chlorine, bromine, or iodine, and most preferably chlorine, and n is 0, 1 or 2. Most preferably in this embdiment, a solution of such an organomagnesium composition is a Grignard reagent and the carrier material is contacted with the solution thereof in the absence of ball milling.

Preferably, the carrier is treated with the aforementioned solution in such a manner that, after the treatment is completed, the carrier has magnesium incorporated into the pores thereof. As used herein, the concept of incorporating a material onto a carrier is intended to encompass the incorporation of the material (e.g., magnesium or titanium compositions) onto the carrier by physical or chemical means. Accordingly, the incorporated material need not necessarily be chemically bound to the carrier. A preferred means of incorporating the magnesium is by adding a porous carrier to a liquid medium containing a dissolved organomagnesium composition of the formula $R_nMgR'_{(2-n)}$ and to maintain it in the suspension for about 0.1 to about 10, preferably about 0.5 to about 5, and most preferably for about 1.0 to about 2.0 hours (hrs) at a temperature of about 25 to about 200, preferably about 50 to about 100, and most preferably about 60° to about 80° C. As a reult of this treatment, magnesium becomes incorporated into the pores of the carrier. More particularly, the magnesium is incorporated into the pores of the carrier by: (1) a chemical reaction of the organomagnesium composition with the carrier, (2) a precipitation of magnesium from the organomagnesium composition onto the carrier or (3) a combination of such a reaction and precipitation.

Suitable solvents for Grignar reagents are ethers, such as aliphatic ethers, e.g., diethyl ether, diisopropyl ether, dibutyl ether, dipentyl ether and ethyl-n-butyl ether and cyclic ethers, such as tetrahydrofuran and dioxane. Thus, the liquid medium containing the organomagnesium composition is usually an ether, preferably tetrahydrofuran.

It is important for the purposes of the most preferred embodiment of the present invention, that the number of moles of the organomagnesium composition in the solution used to contact the carrier be in excess of the number of moles of the OH groups on the carrier, so that the molar ratio of the organomagnesium composition in the solution to the hydroxyl groups is greater than 1.0, preferably it is from about 1.1 to about 3.5, more preferably from about 1.5 to about 3.5., and most preferably from about 2.0 to about 3.5.

It is also important for the purposes of the most preferred embodiment of the present invention, that the number of moles of the sum of all magnesium-containing compounds on the carrier, in the product of the second step of the catalyst synthesis of this invention, be in excess of the number of moles of the OH groups originally present on the carrier, prior to the contact of the carrier with the liquid containing the organomagnesium composition. The molar ratio of the sum of all magnesium-containing compounds in the product of the second step to the aforementioned OH groups is greater than 1, preferably it is from about 1.1 to about 3.5, more preferably from about 1.5 to about 3.5, and most preferably from about 2.0 to about 3.5.

To assure that most, if not all, of the magnesium-containing compound(s) are retained on the carrier, the liquid is removed from the reaction vessel with care to assure that none or very little magnesium-containing compound(s) are removed with it. The liquid may be removed by any means assuring that substantially all of the magnesium-containing compound(s) remain on the carrier, e.g., by distillation of the mixtures of the impregnated carrier and the solvents, evaporation, decantation or centrifugation. Evaporation at about the boiling point of the liquid is the most preferred method of liquid removal. It is also important that the product of the second synthesis steps not be subjected to washing or rinsing, so that the excess of the magnesium-containing compound or compounds which did not react with the hydroxyl (OH) groups of the carrier is retained on the carrier.

After the liquid is removed, the resulting product may be dried by any conventional means, e.g., at ambient temperature or at 50°-80° C. for about 12-16 hours with a stream of dry nitrogen to produce a dry, free-flowing powder.

The amount of magnesium-containing compound(s) which is incorporated onto the carrier should be sufficient to react with the transition metal compounds. The preferred transition metal compounds used in the most preferred embodiment of the invention are tetravalent titanium compounds. Thus, the most preferred embodiment will be described hereinafter in conjunction with the use of such tetravalent titanium compounds. Thus, the amount of magnesium-containing compound(s) incorporated onto the carrier must be sufficient to react with the tetravalent titanium to incorporate a catalytically effective amount of titanium on the carrier in the manner set forth hereinbelow. Thus, the carrier should comprise from about 0.1 to about 50, preferably about 0.1 to about 5 millimoles (mmols) of magnesium per gram of carrier (after the treatment of the carrier with the organomagnesium composition is completed).

The free-flowing powder obtained in the second step is reacted with at least one tetravalent titanium compound dissolved in a liquid medium diluent. The titanium compound is soluble in this liquid reaction medium, while the treated carrier (i.e., the free-flowing powder), including the magnesium-containing compound(s), is insoluble in this liquid reaction medium. Thus, the reaction which takes place between the tetravalent titanium and the reaction magnesium-containing compound(s) is a reaction of a solid with a liquid. It is further noted that the reacted titanium is insoluble in the liquid reaction medium.

Without wishing to be bound by any theory of operability, it is thought that the reaction which takes place between the magnesium compound which is not a reaction product of an organomagnesium composition with the carrier and the tetravalent titanium in the liquid reaction medium is substantially an oxidation/reduction reaction, wherein the magnesium compound acts as a reducing agent for the tetravalent titanium. On the other hand, while not wishing to be bound by any particular operability theory or chemical mechanism, the reaction which takes place between (1) tetravalent titanium and (2) the reaction product of an organomagnesium composition and the carrier containing reaction OH groups is not an oxidation/reduction reaction. However, both of the above-mentioned reactions lead to the incorporation of titanium onto the carrier.

The tetravalent titanium compound or compounds used in the most preferred embodiment are any titanium compounds soluble in the liquid medium used in the third catalyst synthesis step, such as titanium halides, e.g., titanium tetrachloride, $TiCl_4$, titanium tetrabromide, $TiBr_4$, titanium alkoxides, wherein the alkoxide moiety has a branched or unbranched alkyl radical of 1 to about 20 carbon atoms, preferably 1 to about 6 carbon atoms. The most preferred titanium compound is titanium tetrachloride.

Mixtures of such titanium compounds may also be used and generally no restrictions are imposed on the titanium compounds which may be included. Any titanium compound that may be used alone may also be used in conjunction with other titanium compounds.

Suitable liquid medium diluents are materials in which the tetravalent titanium compounds are at least partially soluble and which are liquid at reaction temperatures. Preferred diluents are alkanes, such as hexane, n-heptane, octane, nonane, and decane, although a variety of other materials including cycloalkanes, such as cyclohexane, aromatics, such as benzene and ethylbenzene, and halogenated and hydrogenated aromatics, such as chlorobenzene or ortho-dichlorobenzene, can be employed. The most preferred diluent is n-heptane. Prior to use, the diluent should be purified, e.g., by percolation through silica gel and/or molecular sieves, to remove traces of water, oxygen, polar compounds, and other materials capable of adversely affecting catalyst activity. The magnesium-containing dry, free-flowing powder is reacted with one or more tetravalent titanium compound(s) at a temperature and for a time sufficient to yield a solid catalyst component. Temperatures at which this reaction is conducted range from about −40° to about 250° C., preferably, from about 0° to about 170° C., and most preferably the reaction is conducted at a temperature of 25°-100° C. Suitable reaction times range from about ½ to about 25 hours, with about ½ to about 6 hours being preferred.

The reaction of the tetravalent titanium in the liquid medium with the magnesium-containing carrier material takes place by slurrying the carrier material in a solution of the tetravalent titanium compound in the diluent and heating the liquid reaction medium to a suitable reaction temperature, e.g., to the reflux temperature of the diluent at standard atmospheric pressure. Thus, the reaction may take place under reflux conditions.

The various reaction parameters can be widely varied, suitable selection of such parameters being well within the skill of those having ordinary skill in the art. The volume of the tetravalent titanium compound solution added to the magnesium-containing powder initially slurried in the solution is from about 0.1 to about 10 milliliters (mls) per gram (gm) of such carrier. The concentration of the titanium compound solution is, for example, from about 0.1 to about 5 Molar.

As indicated above, the catalysts of the present invention are prepared in the substantial absence of water, oxygen, and other catalyst poisons. Such catalyst poisons are excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of any diluents employed in the first and third preparative steps in the manner described above also is helpful in this regard.

It may also be possible to replace, in the most preferred embodiment of the invention, some or all of the above-mentioned tetravalent titanium compounds with one or more other transition metal compounds. Such other transition metal compounds are exemplified in Graff et al, U.S. Pat. No. 4,173,547, column 6, lines 55-60. Preferred transition metal compounds are zirconium compounds (e.g., $ZrCl_4$).

The thus-formed supported catalyst of any of the embodiments of this invention is activated with suitable activators, also known as co-cocatalysts or catalysts promoters. The activators are known in the art and they include any of the materials commonly employed as promoters for olefin polymerization catalyst components containing compounds of the Group IB, IIA, IIB, IIIB and IVB of the Periodic Chart of the Elements, published by Fisher Scientific Company, Catalog Number 5-702-10, 1978. Examples of such promoters are metal alkyls, hydrides, alkylhydrides, and alkylhalides, such as alkyllithium compounds, dialkylzinc compounds, trialkylboron compounds trialkylaluminum compounds, alkylaluminum halides and hydrides, and tetraalkylgermanium compounds. Mixtures of such compounds can also be used. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred for use according to this invention are the Group IIIB metal alkyls and dialkylhalides having 1 to about 20 carbon atoms per alkyl radical. More preferably, the promoter is a trialkylaluminum compound having 1 to about 6 carbon atoms per alkyl radical. The most preferred promoter is triethylaluminum.

The organometallic promoter is employed in an amount which is at least effective to promote the polymerization activity of the solid component of the catalyst of this invention. Preferably, at least about three parts by weight of promoter are employed per part, by weight, of solid catalyst component, although higher ratios, such as 10:1, 25:1, 100:1 or higher also are suitable and often give highly beneficial results. In slurry polymerization processes, a portion of the promoter can be employed to pretreat the polymerization medium if desired. Other promoters which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59.

The catalyst may be activated in situ by adding the activator and catalyst separately to the polymerization medium. It is also possible to combine the catalyst and activator before introduction thereof into the polymerization medium, e.g., for up to about 2 hours prior to the introduction thereof into the polymerization medium at a temperature of from about −40° to about 100° C.

A suitable activating amount of the activator may be used to promote the polymerization activity of the catalyst. The aforementioned proportions of the activator can also be expressed in terms of the number of moles of activator per gram atom of titanium in the catalyst composition, e.g., from about 1 to about 100, preferably about 5 to about 100 moles of activator per gram atom of titanium. Alpha-olefins may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. The molecular weight control is evidenced by a measurable positive change in melt index ($I_2$) of the polymer produced.

The molecular weight distribution of the polymers prepared in the presence of the catalysts of the present invention, as expressed by the melt flow ratio (MFR) values, varies from about 29 to about 50 for LLDPE products having a density of about 0.912 to about 0.930 g/cc, and an $I_2$ melt index of about 0.1 to about 4.0. As is known to those skilled in the art, such MFR values are indicative of a relatively narrow molecular weight distribution of polymers, thereby rendering them especially suitable for injection molding and film blowing applications since the products can be used as injection molded containers and thermoplastic films.

The catalysts prepared according to the present invention are highly active, their productivity is at least about 1300, and can be as much as about 5000, grams of polymer per mmole of titanium per 100 psi of ethylene per hour.

The polymers prepared in accordance with the present invention may be homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred polymers are copolymers of ethylene and 1-hexene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating the same is described by Levine et al, U.S. Pat. No. 4,011,382 and Karol et al, U.S. Pat. No. 4,302,566, the entire contents of both of which being incorporated herein by reference, and by Nowlin et al, U.S. Pat. No. 4,481,301.

The following Examples further illustrate the essential features of the invention. However, it will be apparent to those skilled in the art that the specific reactants and reaction conditions used in the Examples do not limit the scope of the invention.

EXAMPLE 1

(Catalyst Syntheses)

All procedures were carried out in glass or quartz equipment under purified nitrogen using predried nitrogen-purged solvents.

Catalyst Preparation

First Step:

15 grams of CS 1231, silica available from the PQ Corporation, Valley Forge, Pa., heated at 800° C. in the atmosphere of dry nitrogen for about twenty-two (22) hours, was placed into a 500 ml flask under a slow nitrogen purge. Approximately 300 ml of dry hexane was added while stirring and the contents were heated to reflux. 10 ml of a 25% wt. solution of ethylmagnesium chloride (EtMgCl) in tetrahydrofuran (THF) was added dropwise to the refluxing solution. The reflux was continued for forty-five (45) minutes. Then, the solvent was removed by distillation to about 60° C. and the product was dried at 80° C. for about 18 hours in nitrogen atmosphere to yield a free-flowing powder. Yield 20 grams (gm); Mg=1.02 mmols/gram (mM/gm); THF=0.62 mM/gm; Cl=1.02 mM/gm.

Second Step:

10.0 grams of the product from the first step (10.2 mmols Mg) was placed into a 500 ml flask under a slow nitrogen purge. 300 ml of dry heptane was added to the flask and the contents slurried for about ten (10) minutes. 5 ml of titanium tetrachloride (TiCl$_4$) was added to the flask and the slurry was heated to reflux for about 1 hour. The catalyst was filtered and washed ten (10) times with 50 ml portions of dry hexane. The product was dried overnight at room temperature in nitrogen atmosphere. Yield 11.2 grams of product which analyzed as follows: Mg=0.90 mmols/gram; Ti=0.60 mmols/gram; Cl=3.4 mmols/gram; THF=0.28 mmols/gram.

EXAMPLES 2–7

(Catalysts and Comparative Catalysts Synthesis)

Additional catalysts were prepared in accordance with the procedure of Example 1, except that different silica supports, having different pore diameters, were used in the first catalyst synthesis step. Silica supports, their physical characteristics and the physical characteristics of the resulting catalyst compositions are summarized in Table I. Some silica samples listed in Table I have average pore diameters smaller than necessary for the catalyst compositions of this invention. Such silicas, e.g., Davison 952 and CS 1832, were used to compare the performance of the catalyst compositions prepared therewith to that of the catalyst compositions of the present invention.

EXAMPLES 8–21

(Preparation of LLDPE Products)

Linear low density polyethylene products were prepared in a 1-liter autoclave. In a typical experiment (Example 8), the autoclave was heated under a nitrogen purge to about 90° C. for one hour and then cooled to ambient temperature. About 700 mililiter (ml) of hexane and 45 grams of 1-hexene were added while stirring at about 750 rpm. (The total volume of hexane and hexene was about 750 ml in each experiment.) The catalyst was prepared for study by adding about 0.2 grams of the catalyst of Example 1 to a dry, nitrogen blanketed catalyst addition flask. About 2 ml of 25% by volume of triethylaluminum (TEAL) in hexane was added to the autoclave.

The autoclave was then heated to about 60° C. and hydrogen added to given an increase in pressure of about 20 psi. The autoclave was then heated at about 3° C./minute to 80° C. At this temperature, ethylene was introduced into the reactor giving the total of 100 psig. After hexane saturation by ethylene was complete, the dry catalyst was washed into the reactor with about 50 ml of hexane.

TABLE I

| | PHYSICAL PROPERTIES OF PQ SILICAS, DAVISON 952 SILICA AND CORRESPONDING CATALYSTS | | | | | | | | | | |
|---|---|---|---|---|---|---|---|---|---|---|---|
| | Silica | | | | Catalyst | | | | | | |
| Example | Silica Support | Surface Area (m$^2$/gm) | Pore Volume (cc/gm) | Average Pore Diameter (Ang.) | Surface Area (m$^2$/gm) | Pore Volume (cc/gm) | Average Pore Diameter (Ang.) | [Mg] found (mm/gm) | [Mg] calc. (mm/gm) | [Ti] found (mm/gm) | [Ti]/[Mg] found |
| 1 | CS 1231* | 348 | 1.58 | 182 | 241 | 1.09 | 180 | 1.0 | 0.98 | 0.89 | 0.89 |
| 2 | CS 1832 | 307 | 1.54 | 200 | 284 | 1.09 | 154 | 0.90 | 0.93 | 1.0 | 1.1 |
| 3 | CS 1040 | 309 | 1.14 | 148 | 269 | 0.723 | 108 | 1.0 | 0.97 | 0.89 | 0.89 |

TABLE I-continued
PHYSICAL PROPERTIES OF PQ SILICAS, DAVISON 952 SILICA AND CORRESPONDING CATALYSTS

| | Silica | | | Catalyst | | | | | | |
|---|---|---|---|---|---|---|---|---|---|---|
| Example | Silica Support | Surface Area ($m^2$/gm) | Pore Volume (cc/gm) | Average Pore Diameter (Ang.) | Surface Area ($m^2$/gm) | Pore Volume (cc/gm) | Average Pore Diameter (Ang.) | [Mg] found (mm/gm) | [Mg] calc. (mm/gm) | [Ti] found (mm/gm) | [Ti]/[Mg] found |
| 4 | CS 3131 | 304 | 2.61 | 343 | 258 | 1.36 | 211 | 1.0 | 1.0 | 0.70 | 0.70 |
| 5 | CS 0470 | 654 | 0.27 | 17 | 55 | 0.044 | 32 | 0.95 | 1.0 | 0.43 | 0.45 |
| 6 | CS 2133 | 331 | 2.13 | 257 | 259 | 1.26 | 195 | 0.95 | 0.93 | 0.86 | 0.91 |
| 7 | Davison 952** | 283 | 1.52 | 215 | 249 | 1.02 | 164 | 0.90 | 0.95 | 0.92 | 1.0 |

*All of the silicas designated by letters "CS" were obtained from the PQ Corporation
**Davison 952 is a tradename of a silica available from W. R. Grace and Company, Davison Chemical Division, Baltimore, Md.

The ethylene was introduced through a Hastings Mass Flowmeter NALL-50KG/CC-420 interfaced with a strip chart recorder to monitor ethylene flow (gms/minute) as a function of time (minutes).

At the end of the polymerization time, about 30 minutes, the autoclave was cooled to room temperature, opened and the contents placed in a large container. About 300 ppm of Irganox 1076 was added as a hexane solution and volatiles allowed to evaporate under a hood. Polymer yield was about 150 grams.

Table II summarizes the polymerization conditions and properties of the products. Examples 9-21 were conducted in the manner identical to that of Example 8, described above, except for the changes described in Table II.

Figure 4:
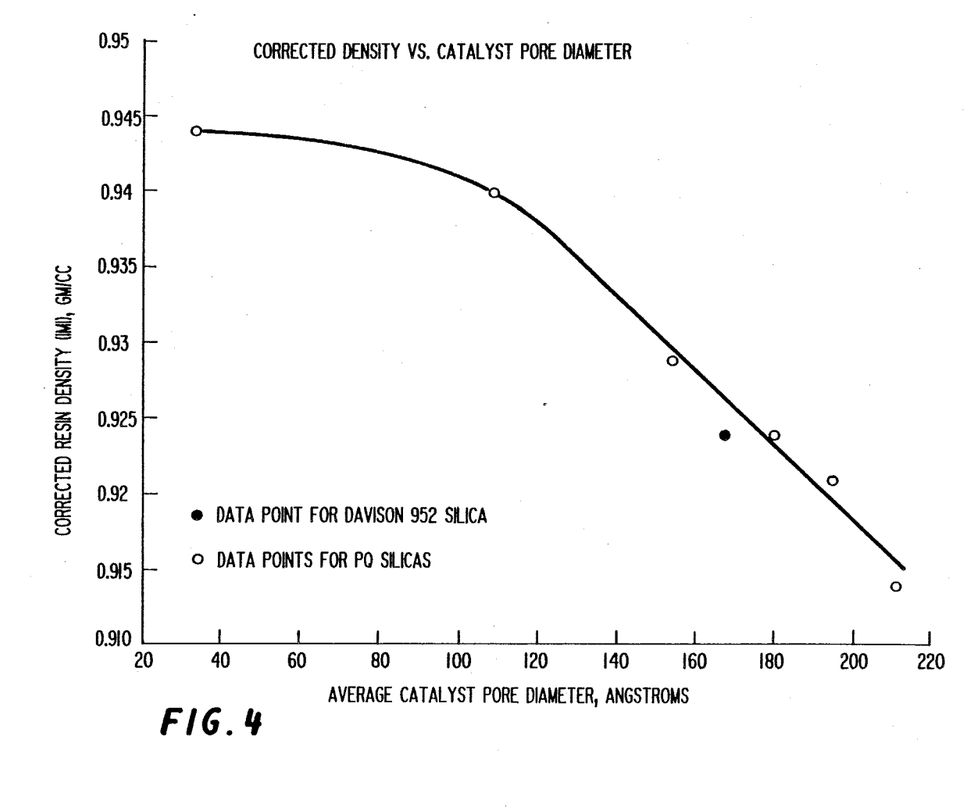
Figure 5:
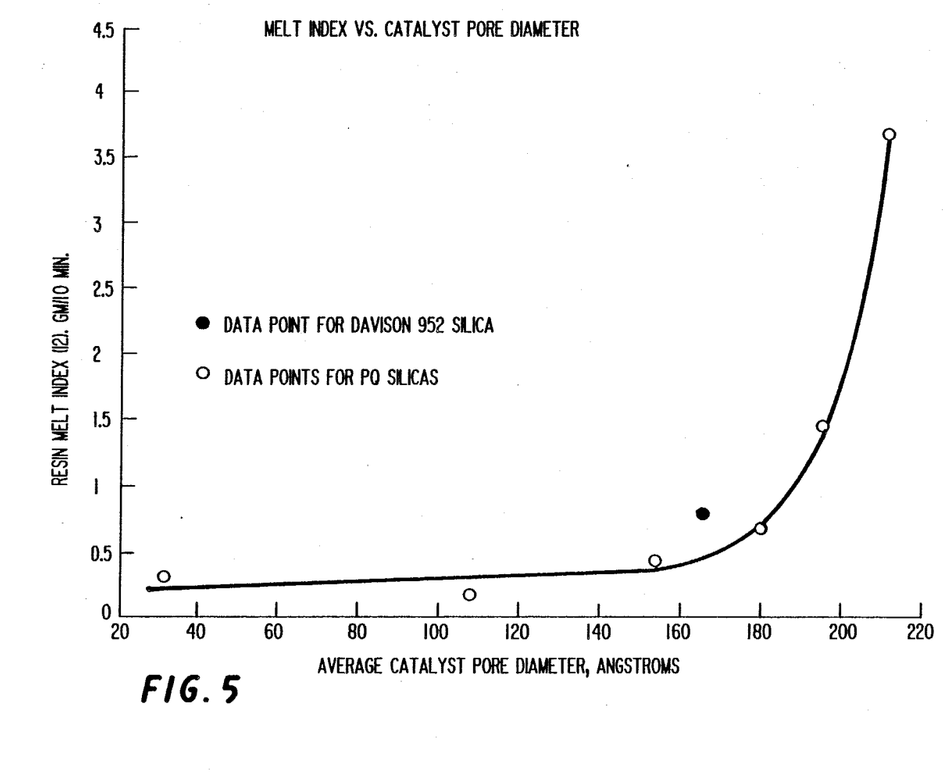
FIG. 5 is a graphical representation of the effect of average catalyst pore diameter on melt index ($I_2$) properties of the polymer, for the catalysts of Examples 1-21.
Figure 6:
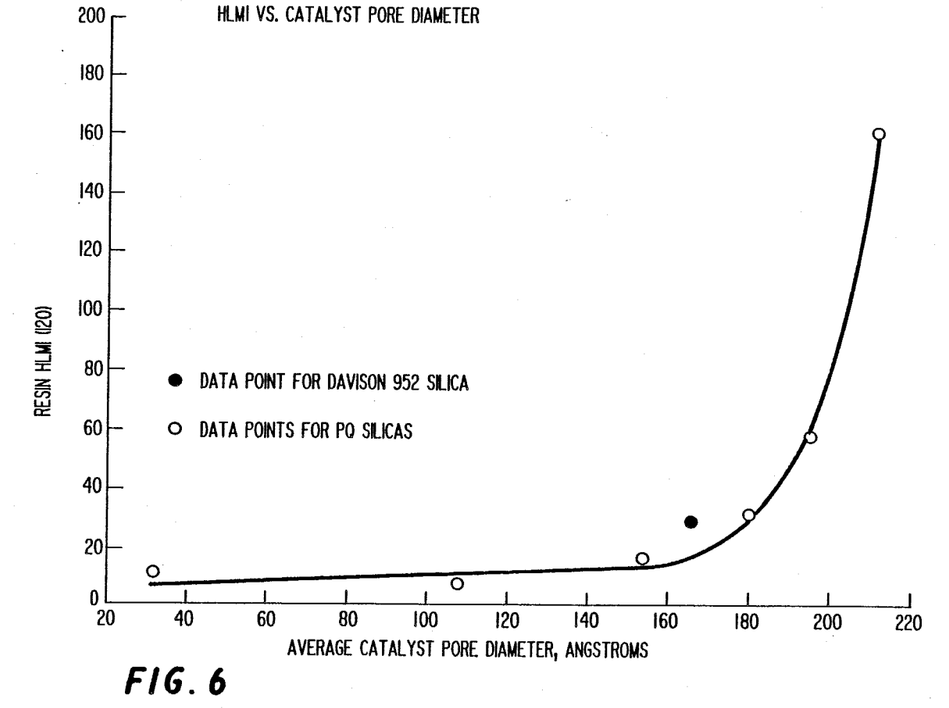
FIG. 6 is a graphical representation of the effect of average catalyst pore diameter on high load melt index ($I_{21}$) properties of the polymer, for the catalysts of Examples 1-21.

The results of the data presented in Tables I and II are also presented graphically in FIGS. 2-6. The data rected or uncorrected, decreases with increasing catalyst pore diameter (FIG. 4). It is significant that productivity, melt index and high load melt index begin to increase significantly when the catalyst pore diameter reaches the value of 170 Angstroms, since this effect was not previously recognized by others. For example, Nowlin et al, U.S. Pat. 4,481,301, disclose a similar catalyst composition prepared with Davison 952 silica. As the data for FIGS. 2-6 indicates, the catalyst compositions prepared with such silica have average catalyst pore diameter of about 165 Angstroms. These catalyst compositions exhibit lower values of productivity than the catalyst compositions of the invention. The polymers prepared with such Davison 952-supported silica have lower melt index and high load melt index values, and higher density than the catalyst compositions of this invention.

TABLE II
POLYMER PHYSICAL PROPERTIES AS A FUNCTION OF CATALYST PORE DIAMETER
(Average Values for the Same Catalyst Given in Parentheses)

Figure 1:
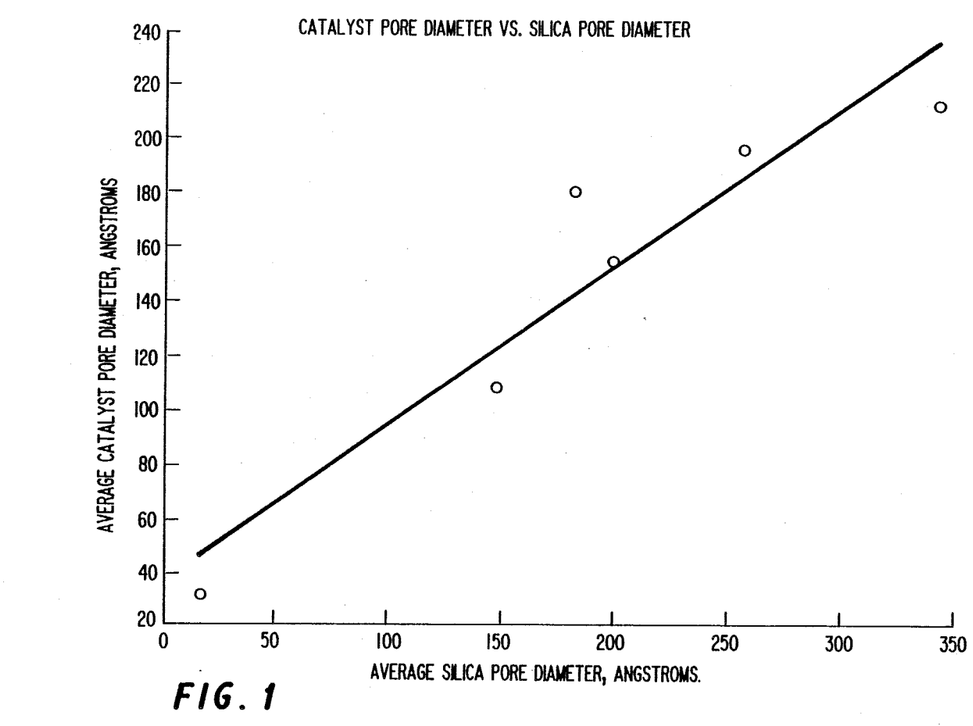
FIG. 1 is a graphical representation of the correlation between the average silica pore diameter and average catalyst pore diameter for the silica used in Examples 1-21.
Figure 2:
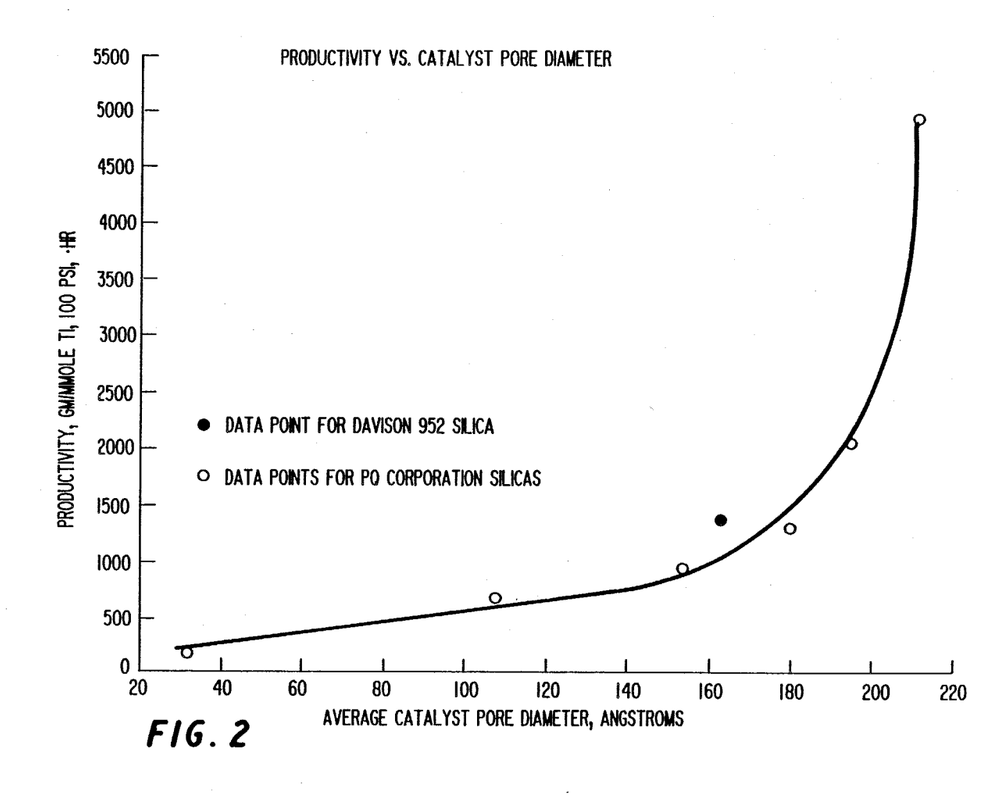
FIG. 2 is a graphical representation of the effect of average catalyst pore diameter on the catalyst productivity for the catalysts of Examples 1-21.
Figure 3:
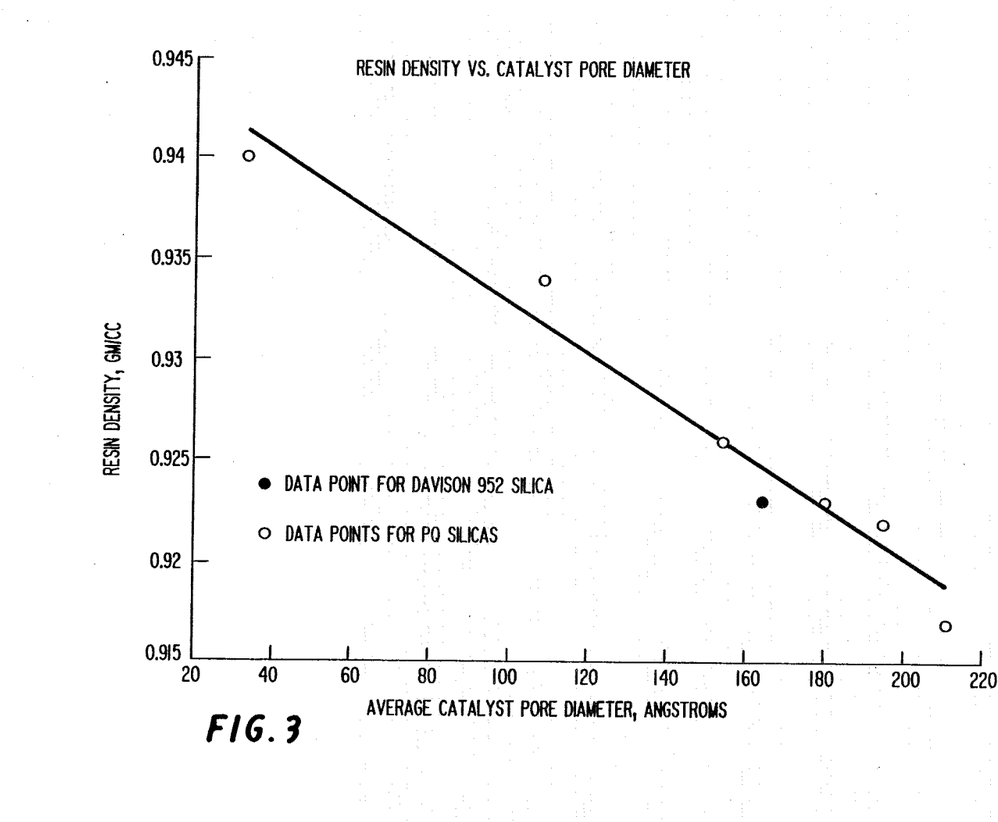
FIGS. 3 and 4 are graphical representation of the effects of average catalyst pore diameter on polymer density for the catalysts of Examples 1-21.

| Example | Catalyst Of Example | Catalyst Avg. Pore Diameter (Å) | Productivity (gm product/Mmole Ti · 100 psi · $C_2$= hr) | Density (gm/cc) | Avg. Density Corrected to 1MI (gm/cc) | MI($I_2$) (gm/10 min) | HLMI ($I_{21}$) (gm/10 min) | MFR |
|---|---|---|---|---|---|---|---|---|
| 8 | 1 | 180 | 1351 | 0.921 | | 0.949 | 46.3 | 48.8 |
| 9 | 1 | 180 | 1310 | 0.925 | 0.924 | 0.424 | 19.2 | 45.3 |
| | | | (1331) | (0.923) | | (0.687) | (32.8) | (47.1) |
| 10 | 2 | 154 | 937 | 0.926 | | 0.443 | 18.4 | 40.7 |
| 11 | 2 | 154 | 1000 | 0.925 | 0.929 | 0.447 | 16.6 | 37.1 |
| | | | (969) | (0.926) | | (0.445) | (17.4) | (38.9) |
| 12 | 3 | 108 | 687 | 0.934 | | 0.195 | 7.62 | 39.2 |
| 13 | 3 | 108 | 729 | 0.934 | 0.940 | 0.173 | 7.35 | 42.5 |
| | | | (706) | (0.934) | | (0.184) | (7.49) | (40.9) |
| 14 | 4 | 211 | 4807 | 0.916 | | 3.69 | 174 | 47.1 |
| 15 | 4 | 211 | 5090 | 0.918 | 0.914 | 3.69 | 150 | 40.5 |
| | | | (4959) | (0.917) | | (3.69) | (162) | (43.8) |
| 16 | 5 | 32 | 211 | 0.937 | | 0.378 | 13.2 | 34.9 |
| 17 | 5 | 32 | 146 | 0.943 | 0.944 | 0.266 | 9.81 | 36.9 |
| | | | (179) | (0.940) | | (0.322) | (11.5) | (35.9) |
| 18 | 6 | 195 | 1786 | 0.924 | | 1.93 | 74.5 | 38.6 |
| 19 | 6 | 195 | 2385 | 0.920 | 0.921 | 1.01 | 43.3 | 42.8 |
| | | | (2086) | (0.922) | | (1.47) | (58.9) | (40.7) |
| 20 | 7 | 164 | 1563 | 0.921 | | 0.695 | 28.5 | 40.7 |
| 21 | 7 | 164 | 1355 | 0.925 | 0.924 | 0.909 | 36.8 | 40.5 |
| | | | (1459) | (0.923) | | (0.802) | (32.7) | (40.6) | shows that catalyst productivity, and polymer melt index and high load melt index, increase substantially as the pore diameter of the catalyst, and hence of the silica used in its preparation (see FIG. 1, establishing the proportional relationship between the pore sizes of silica and the catalyst), increases. Calculated polymer density values in Table II were standardized to 1.0 Melt Index (MI), $I_2$, in the manner described by Elston, U.S. Pat. No. 3,645,992, the entire contents of which are incorporated herein by reference, because MI is known to inversely affect resin density. For example, resin of lower MI is likely to have lower density than an equivalent resin of higher MI. Density of the polymer, cor- It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A process for preparing an alpha-olefin polymer comprising polymerizing at least one $C_2$-$C_{10}$ alpha-olefin in the presence of a supported catalyst composition having an average pore diameter of at least about 170 Angstroms prepared by activating a catalyst precursor with a co-catalyst, the precursor being prepared by a process comprising the steps of:
(i) contacting a solid, porous carrier having reactive OH groups with a liquid containing at least one organomagnesium composition having the empirical formula:

$$R_nMgR'_{(2-n)}$$

where R and R' are the same or different and they are $C_1-C_{12}$ hydrocarbyl groups, provided that R' may also be a halogen, and n is 0, 1 or 2, the number of moles of said organomagnesium composition being in excess of the number of moles of said OH groups on said carrier;
(ii) evaporating said liquid from step (i) to produce a supported magnesium composition in the form of a dry, free-flowing powder; and
(iii) reacting said powder of step (ii) with at least one transition metal compound in a liquid medium, the number of moles of said transition metal compound being in excess of the number of the OH groups on said carrier prior to the reaction of the carrier with said organomagnesium composition in step (i), said transition metal compound being soluble in said liquid medium, and said supported magnesium composition being substantially insoluble in said liquid medium, whereby a reacted form of transition metal which is insoluble in said liquid medium becomes supported on said carrier.

2. A process of claim 1, wherein said polymer is selected from the group consisting of ethylene homopolymers, ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

3. A process of claim 2 wherein said polymer is a linear low density polymer having a density of 0.940 g/cc or less.

4. A process of claim 3, wherein said linear low density polyethylene polymer is an ethylene/hexene-1 copolymer having a density of less than about 0.930 g/cc, said copolymer being prepared in a gas phase, fluid bed reactor.

5. A process of claim 4 wherein the supported catalyst composition has an average pore diameter of about 170 to about 220 Angstroms.

6. A process of claim 5 wherein the supported catalyst composition has an average pore diameter of about 175 to about 215 Angstroms.

7. A process of claim 6 wherein the supported catalyst composition has an average pore diameter of about 211 Angstroms.

8. A process of claim 7 wherein n is 1.

9. A process of claim 8 wherein said step (i) comprises:
(a) slurrying the carrier in a non-Lewis base liquid; and
(b) adding to the slurry resulting from step (a) the organomagnesium composition in the form of an ether solution thereof.

10. A process of claim 9 wherein the ether is tetrahydrofuran.

11. A process of claim 10 wherein the porous, solid carrier is silica, alumina or combinations thereof.

12. A process of claim 11 wherein the porous, solid carrier is silica.

13. A process of claim 12 wherein the transition metal compound is a tetravalent titanium compound.

14. A process of claim 13 wherein the tetravalent titanium compound is $TiCl_4$.

15. A process of claim 14 wherein, the step (i), the ratio of the number of moles of said organomagnesium composition to the number of moles of the OH groups on said silica is from about 1.1 to about 3.5.

16. A process of claim 15 wherein, in step (i), the ratio of the number of moles of said organomagnesium composition to the number of moles of the OH groups on said silica is about 2.0 to about 3.5.

17. A process of claim 16 wherein said liquid medium is an alkane, cycloalkane, aromatics or halogenated aromatics.

18. A process of claim 17 wherein said liquid medium is hexane.

19. A process of claim 18 wherein, prior to contacting the silica in step (i), it is heated at a temperature of about 750° C. for at least four hours.

20. A process of claim 19 wherein the organomagnesium composition is ethylmagnesium chloride.

21. A process of claim 20 wherein the polymer is an LLDPE polymer having melt flow ratio of about 29 to about 50, density of about 0.912 to about 0.930 g/cc and an $I_2$ melt index of about 0.1 to about 4.0.

22. A process of claim 1 wherein the supported catalyst composition has an average pore diameter of at least about 180 Angstroms.

* * * * *